United States Patent [19]

Badesha et al.

[11] Patent Number: 5,366,772
[45] Date of Patent: * Nov. 22, 1994

[54] FUSER MEMBER

[75] Inventors: Santokh S. Badesha, Pittsford; Robert M. Ferguson, Penfield; Louis D. Fratangelo, Fairport; George J. Heeks, Rochester; Arnold W. Henry, Pittsford; David H. Pan, Rochester, all of N.Y.

[73] Assignee: Xerox Corporation, Stamford, Conn.

[*] Notice: The portion of the term of this patent subsequent to Nov. 24, 2009 has been disclaimed.

[21] Appl. No.: 98,088

[22] Filed: Jul. 28, 1993

[51] Int. Cl.$^5$ .............................................. B32B 1/08
[52] U.S. Cl. .................... 428/35.8; 492/53; 492/56; 430/98; 430/99; 428/36.9; 428/421; 428/447; 428/450; 428/451; 428/457
[58] Field of Search ............ 428/35.8, 36.9, 421, 428/447, 450, 451, 457, 906; 430/98, 99; 492/18, 53, 56, 59; 525/903; 355/279, 285, 290, 295

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 4,257,699 | 3/1981 | Lentz | 355/3 |
| 4,264,181 | 4/1981 | Lentz et al. | 355/3 |
| 4,272,179 | 6/1981 | Seanor | 355/3 |
| 4,378,389 | 3/1983 | Maruyama et al. | 427/387 |
| 4,659,621 | 4/1987 | Finn et al. | 428/339 |
| 4,777,087 | 10/1988 | Heeks et al. | 428/321.1 |
| 4,830,924 | 5/1989 | Dallavia, Jr. | 428/429 |
| 4,853,737 | 8/1989 | Hartley et al. | 355/289 |
| 5,141,788 | 8/1992 | Badesha et al. | 428/36.8 |
| 5,166,031 | 11/1992 | Badesha et al. | 430/124 |

OTHER PUBLICATIONS

Henry, Arnold W., et al. "Improving Release Performance of Viton Fuser Rolls," *Xerox Disclosure Journal*, vol. 9, #1, Jan./Feb. 1984, p. 43.

Ferguson, Robert M., et al. "Viton IRTV Silicon Fuser Release Overcoating", *Xerox Disclosure Journal*, vol. 11, #5, Sep./Oct. 1986, p. 207.

*Primary Examiner*—Patrick J. Ryan
*Assistant Examiner*—Marie R. Macholl
*Attorney, Agent, or Firm*—John L. Haack; Eugene O. Palazzo

[57] ABSTRACT

A fuser member comprising a supporting substrate, and a outer layer comprised of an integral interpenetrating hybrid polymeric network comprised of a haloelastomer, a coupling agent, a functional polyorganosiloxane and a crosslinking agent.

14 Claims, 1 Drawing Sheet

FUSER MEMBER

CROSS REFERENCE TO RELATED COPENDING APPLICATIONS AND ISSUED PATENTS

Attention is directed to the following copending applications assigned to the assignee of the present application: U.S. application Ser. No. 07/405,392 (D/87188C), now U.S. Pat. No. 5,017,432, with an effective filing date of Sep. 11, 1989, entitled "Fuser Member" in the name of Clifford O. Eddy et al.; U.S. application Ser. No. 07/516,950 (D/89516), now U.S. Pat. No. 5,061,965, filed Apr. 30, 1990, entitled "Fusing Assembly With Release Agent Donor Member" in the name of Robert M. Ferguson, et al.; U.S. application Ser. No. 08/054,172 (D/90415), entitled "Electrophotographic Imaging Members and Method of Making" in the name of Joe Mammino, et al., filed Apr. 30, 1993; U.S. application Ser. No. 08/044,870 (D/92067) in the name of Santokh S. Badesha, et al., entitled "Fusing Components Containing Ceramer Compositions" filed Apr. 8, 1993, and U.S. application Ser. No. 08/044,860 (D/92067Q) in the name of Santokh S. Badesha, et al., entitled "Fusing Compositions Containing Grafted Ceramer Compositions" filed Apr. 8, 1993.

Attention is also directed to commonly assigned U.S. Pat. No. 5,166,031 issued Nov. 24, 1992, entitled "Materials Package for Fabrication of Fusing Components"; U.S. Pat. No. 5,141,788, issued Aug. 25, 1992, entitled "Fuser Member"; and U.S. Pat. No. 4,925,895 issued May 15, 1990, entitled "Heat Stabilized Silicone Elastomers".

BACKGROUND OF THE INVENTION

The present invention relates to a fuser member, a method of fusing toner images in electrostatographic reproducing apparatus and a method for fabricating the fuser member. In particular, the invention relates to a fuser member which may preferably take the form of a fuser roll, pressure roll or release agent donor roll.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 160° C. or higher depending upon the softening range of the particular resin used in the toner. It is undesirable, however, to raise the temperature of the substrate substantially higher than about 200° C. because of the tendency of the substrate to discolor at such at elevated temperatures particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The so called "hot offset" occurs when the temperature of the toner is raised to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To insure and maintain good release properties of the fuser roll, it has become customary to apply release agents to the fuser members to insure that the toner is completely released from the fuser roll during the fusing operation. Typically, these materials are applied as thin films of, for example, silicone oils to prevent toner offset.

Particularly preferred fusing systems take the form of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

One of the earliest successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks, et al. While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly for a fuser roll at elevated temperatures.

Another recent development in fusing systems involves the use of fluoroelastomers as fuser members which have a surface with a metal containing filler, which interact with polymeric release agents having functional groups, which interact with the metal containing filler in the fluoroelastomer surface. Such fusing systems, fusing members and release agents, are described in U.S. Pat. No. 4,264,181 to Lentz et al., U.S. Pat. No. 4,257,699 to Lentz, and U.S. Pat. No. 4,272,179 to Seanor, all commonly assigned to the assignee of the present invention. Typically, the fluoroelastomers are (1) copolymers of vinylidenefluoride and hexafluoropropylene, and (2) terpolymers of vinylidene fluoride, hexafluoropropylene and tetrafluoroethylene. Commercially available materials include: VITON E430, VITON GF and other VITON designations which are trademarks of E. I. Dupont de Nemours, Inc. as well as the FLUOREL materials of 3M Company. The preferred curing system for these materials is a nucleophilic system with a bisphenol crosslinking agent to generate a covalently crosslinked network polymer formed by the application of heat following basic dehydrofluorination of the copolymer. Exemplary of such a fuser member is an aluminum base member with a poly(vinylidenefluoride-hexafluoropropylene) copolymer cured with a bisphenol curing agent having lead oxide filler dispersed therein and utilizing a mercapto functional polyorganosiloxane oil as a release agent. In those fusing processes, the polymeric release agents have functional groups (also designated as chemically reactive functional groups) which interact with the metal containing filler dispersed in the elastomer or resinous material of the fuser member surface to form a thermally stable film which releases thermoplastic resin toner and which prevents the thermoplastic resin toner from contacting the elastomer material itself. The metal oxide, metal salt, metal alloy or other suitable metal compound filler dispersed in the elastomer or resin upon the fuser member surface interacts with the functional groups of the polymeric release agent. Preferably, the metal containing filler materials do not cause degradation of or have any adverse effect upon the polymeric release agent having functional groups. Because of this reaction between the elastomer having a metal containing filler and the polymeric release agent having functional groups, excellent release and the production of high quality copies are obtained even at high operation rates of electrostatographic reproducing machines in copies per minute.

While the mechanism involved is not completely understood, it has been observed that when certain polymeric fluids having functional groups are applied to the surface of a fusing member having an elastomer surface with a metal oxide, metal salt, metal, metal alloy or other suitable metal compounds dispersed therein, there is believed to be an interaction (a chemical reaction, coordination complex, hydrogen bonding or other mechanism) between the metallic filler in the elastomer and the polymeric fluid having functional groups so that the polymeric release agent having functional groups in the form of a liquid or fluid provides an excellent surface for release and has an excellent propensity to remain upon the surface of the fuser member. Regardless of the mechanism, there appears to be the formation of a film upon the elastomer surface which differs from the composition of the bulk elastomer and the composition of the polymeric release agent having functional groups. This film, however, has a greater affinity for the elastomer containing a metal compound than the toner and thereby provides an excellent release coating upon the elastomer surface. The release coating has a cohesive force which is less than the adhesive forces between heated toner and the substrate to which it is applied and the cohesive forces of the toner. The interaction between the functional group of the polymeric release agent and the metal filler containing elastomer leads to an overall diminution of the critical or high surface energy of the metal in the filler.

Preferred elastomers in the aforementioned fuser member compositions are the fluoroelastomers and most preferred fluoroelastomers are the vinylidenefluoride based fluoroelastomers which contain hexafluoropropylene and tetrafluoroethylene as comonomers. Two of the most preferred fluoroelastomers are (1) a class of copolymers of vinylidenefluoride and hexafluoropropylene known commercially as VITON A and (2) a class of terpolymers of vinylidenefluoride, hexafluoropropylene and tetrafluoroethylene known commercially as VITON B. Other commercially available materials include FLUOREL of 3M Company, VITON GH, VITON E 60C, VITON B 910, and VITON E 430. A preferred curing system is a nucleophilic system with a bisphenol crosslinking agent to generate a covalently cross-linked network polymer formed by the application of heat subsequent to basic dehydrofluorination and addition of a coupling agent of the fluoropolymer or copolymer. The nucleophilic curing system may also include an organophosphonium salt accelerator. Some of the commercially available fluoroelastomer polymers which can be cured with the nucleophilic system are VITON E 60C, VITON B 910, VITON E 430, VITON A, VITON B, VITON GF.

The use of polymeric release agents having functional groups which interact with a fuser member to form a thermally stable, renewable self-cleaning layer having superior release properties for electroscopic thermoplastic resin toners is described in U.S. Pat. Nos. 4,029,827 to Imperial et al., 4,101,686 to Strella et al., and 4,185,140 also to Strella et al. In particular, U.S. Pat. No. 4,029,827 is directed to the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

While the abovementioned fluoroelastomers have excellent mechanical and physical properties in that they typically have a long wearing life maintaining toughness and strength over time in a fusing environment, they can only be used with very expensive functional release agents and have to contain expensive interactive metal containing fillers. Typically, for example, the functional release agents are of the order of four times as expensive as their nonfunctional conventional silicone oil release agents.

Attempts have been made to combine certain advantages in each of the fusing systems mentioned above and summarized below.

U.S. Pat. No. 4,853,737, to Heartly et al., describes a fuser roll comprising a cured fluoroelastomer containing pendant diorganosiloxane segments that are covalently bonded to the backbone of the fluoroelastomer. The siloxane is appended to the fluoroelastomer by adding to the composition to be cured a polydiorganosiloxane oligomer having functional groups such as phenoxy or amino groups to form the covalent bond. The fuser member preferably has a metal oxide containing filler to react with functional release agent.

"Improving Release Performance of Viton Fuser Rolls", by Henry et al., Xerox Disclosure Journal, Volume 9, No. 1, January/February 1984, discloses a fuser member made of a copolymer of vinylidenefluoride and hexafluoropropylene which has a tendency to react with the toner charge control agent producing increased crosslinking and thereby hardening as the double bonds of the fluoroelastomer become saturated to prevent further crosslinking by the addition of a silanic hydrogen compound, such as polymethylhydrosiloxane to covalently bond the siloxane to the surface of this fluoroelastomer and thereby prevent further hardening, and in addition provides good release characteristics.

"Viton/RTV Silicone Fuser Release Overcoating", Ferguson et al., Xerox Disclosure Journal, Volume 11, No. 5, September/October 1986, describes a fusing member wherein a fluoroelastomer such as a copolymer of vinylidenefluoride and hexafluoropropylene and an RTV Silicone Rubber are co-dissolved, co-sprayed and co-cured on an aluminum substrate to provide a uniform dispersion of silicone within the fluoroelastomer matrix. Such a fuser surface is described as having the mechanical strength of the fluoroelastomer and the release properties of the silicone and may be used with traditional dimethyl silicone release fluids.

Various compositions for components of fuser members are known as illustrated by: Badesha et al., U.S. Pat. No. 5,141,788; Eddy et al., U.S. Pat. No. 5,017,432; and Henry, "Fuser Roll Coatings," Xerox Disclosure Journal, Vol. 4, No. 6, p. 821 (November/December 1979).

Compositions containing organic and inorganic components and processes for the preparation thereof include: Badesha et al., U.S. Pat. No. 5,116,703; Yu, U.S. Pat. No. 5,013,624; Badesha et al., U.S. Pat. No. 4,917,980; Santoso et al., U.S. Pat. No. 4,400,434; Bjerk et al., U.S. Pat. No. 4,051,100; Marzocchi, U.S. Pat. No. 3,775,163; Miller, U.S. Pat. No. 3,663,842, Lentz et al., "Filler Treatments For Thermally Conductive Silicone Elastomers", Xerox Disclosure Journal, Vol. 5, No. 5, pp. 493–94 (September/October 1980); and Wilkes et al., "Ceramers': Hybrid Materials Incorporating Polymeric/Oligomeric Species Into Inorganic Glasses Utilizing A Sol-Gel Approach", ACS Polymer Reprints, Vol. 26 (2), pp. 300–301 (1985).

Badesha et al., U.S. Pat. No. 5,166,031 disclose a fuser member comprising a supporting substrate having an outer layer of a volume grafted elastomer which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

The disclosures of all the United States patents and other relevant documents mentioned above and hereinafter are incorporated by reference herein in their entirety.

There continues to be a need for materials which have various functionalities and properties and processes for fabrication thereof. In particular, it is desirable to fabricate materials with functionalities having properties including release properties, dielectric properties, and other desirable properties including durability, chemical and thermal stability, lubricity, materials compatibility, and the like. Many of these properties are of interest in electrophotography, particularly with respect to image fusing arts.

SUMMARY OF THE INVENTION

In accordance with an aspect of the present invention a long life fuser member together with a method of preparing the fuser member and a fusing system in which it may be used is provided which does not require the use of functional release agents, or only minor amounts in embodiments, or the presence of metal containing fillers in the fuser member to interact with the functional release agent. Further, a thin surface layer of a polyorganosiloxane release layer is provided on a cured fluoroelastomer surface which does not affect the physical properties of the fluoroelastomer.

In a specific aspect of the present invention a fuser member is provided comprising a supporting substrate, and a outer layer comprised of an integral interpenetrating or cross linked hybrid polymeric network comprised of a haloelastomer, a coupling agent, and a functional polyorganosiloxane. The coupling agent is bonded to the haloelastomer and the functional polyorganosiloxane is in turn condensed with the haloelastomer bound coupling agent to afford a polyorganosiloxane coupled haloelastomer. The polyorganosiloxane coupled haloelastomer material as a solvent solution or suspension may be conveniently coated, dried and cured onto a supporting substrate. The functional polyorganosiloxane is of the formula (below): where R is independently an alkyl, alkenyl, alkylaryl or aryl with from 1 to 20 carbon atoms, wherein the

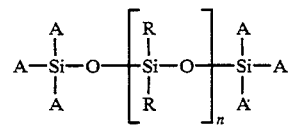

aryl with from 6 to about 30 carbon atoms is optionally substituted with an amino, hydroxy, mercapto, alkyl or alkenyl group, wherein the alkyl or alkenyl group has from about 1 to about 20 carbon atoms, the functional group A is independently an alkoxy or aryloxy group with from 1 to about 10 carbon atoms in each alkoxy or aryloxy group, hydroxy, or a halogen, and n is a number representing the number of segments and, is for example, from 2 to about 350 and represents the number of disubstituted siloxane monomeric units in the polyorganosiloxane.

In another embodiment of the present invention there is provided in embodiments a process for preparing a fuser member comprising: forming a solvent solution of a haloelastomer compound, a dehydrofluorinating agent, and an amino silane coupling agent to afford an amino silane grafted fluoroelastomer; adding a functionally terminated polyorganosiloxane, an optional tetrafunctional siloxane or silane compound of the formula Si(X)$_4$ where X is a halogen, hydroxy, or alkoxy group, and an optional acidic catalyst to said solution to condense the polyorganosiloxane with the amino silane grafted fluoroelastomer to afford a polyorganosiloxane coupled amino silane grafted fluoroelastomer; applying said polyorganosiloxane coupled amino silane grafted fluoroelastomer to a support substrate; curing said polyorganosiloxane coupled amino silane grafted fluoroelastomer compound with a curing agent to form an outer layer on said substrate which layer is a substantially uniform integral interpenetrating or cross linked network of a hybrid composition of said polyorganosiloxane coupled amino silane grafted fluoroelastomer.

Additionally in another embodiment of the present invention, the fluoroelastomer is selected from the group consisting of poly(vinylidenefluoride-hexafluoropropylene) and poly(vinylidenefluoride-hexafluoropropylene-tetrafluoroethylene).

In a further aspect of the present invention, the dehydrofluorination agent is selected from the group consisting of inorganic bases and organic bases such as the alkali and alkaline earth metal bases and amino functional silane compounds.

In a further aspect of the present invention is selected a dehydrofluorinating agent which also serves a dual role as the organosiloxane coupling agent. A dehydrofluorinating agent which can serve as both the dehydrofluorinating agent and the organosilane coupling agent is of the formula:

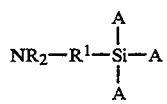

having reactive functionality, where R is at least one hydrogen atom and is selected from the group of hydrogen, alkyl, alkenyl, alkylaryl or aryl group with from 1 to 20 carbon atoms, R$^1$ is an alkyl or alkenyl group with from 1 to 20 carbon atoms or an aryl group with from 6 to about 30 carbon atoms, unsubstituted or substituted with an alkyl or alkenyl group with from 1 to 20 carbon atoms, and the functional groups represented by the letter A are selected from the group hydroxy, alkoxy, aryloxy, or halogen.

In a further aspect of the present invention is provided a process for preparing the fuser member which further comprises employing an optional tetrafunctional siloxane compound of the formula Si(X)$_4$ which may be admixed with the polyorganosiloxane compound during the hydrolysis and condensation steps of the polyorganosiloxane with the grafted aminosilane coupling agent to impart variable levels of rigidity, desirable handling and performance properties to the final product.

In a further aspect of the present invention is provided an optional acid catalyst means for accelerating hydrolysis and condensation reactions associated with attaching the polyorganosiloxane to the haloelastomer grafted aminosilane coupling agent.

In a further aspect of the present invention, the surface layer of integral interpenetrating or cross linked hybrid polymeric network comprised of a haloelastomer, a coupling agent, a functional polyorganosiloxane, and a crosslinking agent is from about 10 to about 250 micrometers thick is coated or may be optionally covalently bonded to an intermediate fluoroelastomer layer through a coupling agent or may be directly applied to the supporting substrate.

In a further aspect of the present invention, the fuser member has a cylindrical sleeve as a supporting substrate and is used as a pressure roll, fuser roll, or release agent donor member.

DETAILED DESCRIPTION OF THE INVENTION

Figure 1:
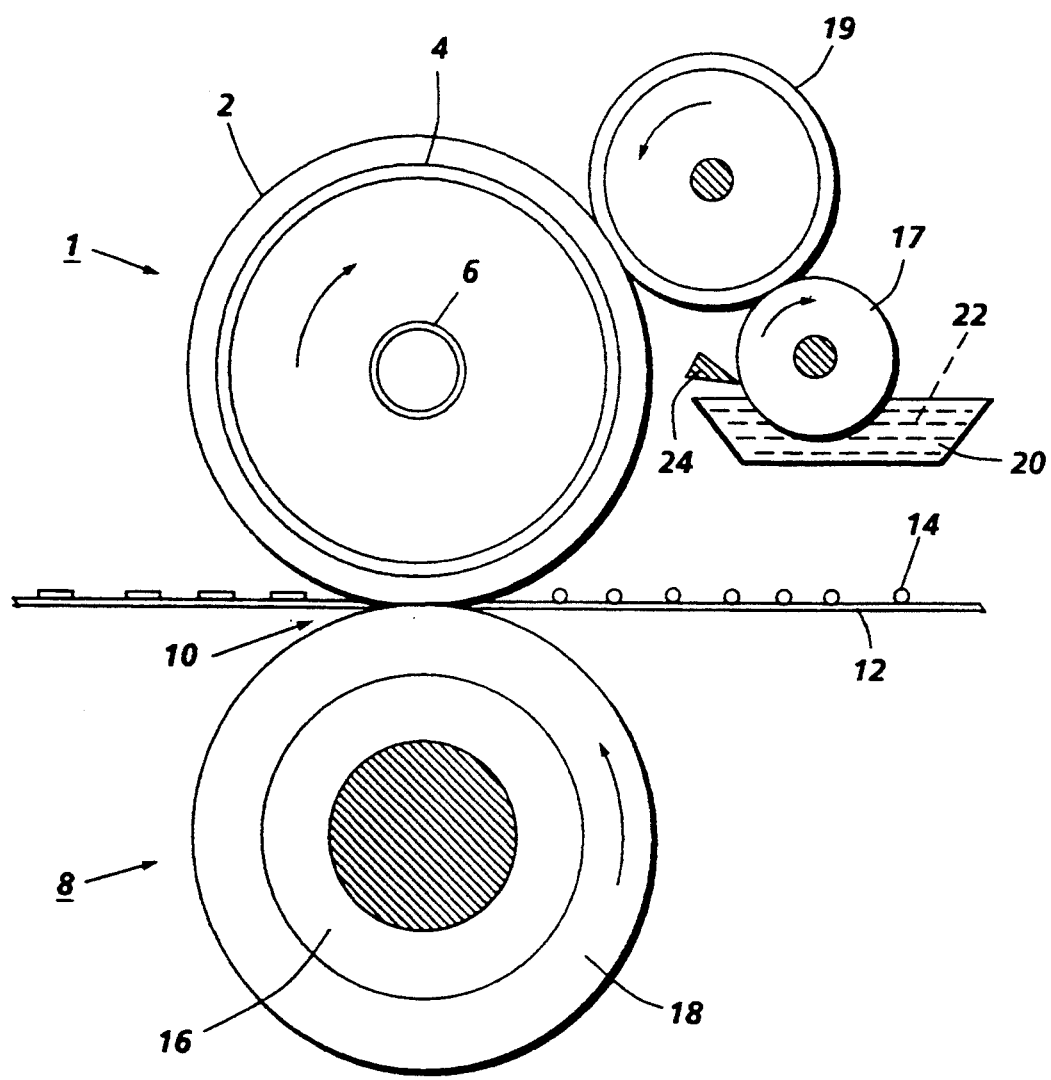
FIG. 1 is a schematic view of a fuser system which may use the fuser member of the present invention.

A typical fuser member of the present invention is described in conjunction with a fuser assembly as shown in FIG. 1 where the numeral 1 designates a fuser roll comprising elastomer surface 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper sheet or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains an optional polymeric release agent. Sump 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24 a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

The term fuser member may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the fuser member is made of a hollow cylindrical metal core, such as copper, aluminum, steel and the like, and has an outer layer of the selected cured fluoroelastomer. Alternatively, there may be one or more intermediate layers of suitable thickness between the substrate and the outer layer of the cured elastomer if desired.

The term "cured amino silane coupled polyorganosiloxane fluoroelastomer" is intended to illustrate for example a hybrid composition comprised of an interpenetrating network comprised of a coupled product comprised of a polyorganosiloxane that is covalently attached or coupled to a fluoroelastomer polymer by way of an aminosilane coupling agent which coupled product is subsequently crosslinked by a curative process to obtain the cured product. Linking the polyorganosiloxane and the fluoroelastomer is provided by a bifunctional coupling agent. In the present invention a —C—N— linkage formed from a bifunctional aminosilane coupling agent and the fluoroelastomer, and a C—O linkage between the polyorganosiloxane and the coupling agent is preferred for mechanical and structural integrity and for ease and convenience of preparation. The structure and the composition of the fluoroelastomer and polyorganosiloxane hybrid are substantially uniform when taken through different cross sections or slices of the outer layer of the fuser member.

The term hybrid composition refers to a composition which is comprised of a fluoroelastomer having polyorganosiloxane blocks randomly arranged and attached thereto via an organosilane coupling agent.

The term interpenetrating network refers to crosslinked or cured product matrix obtained from curative cross linking of the condensation polymerization product of the aminosilane coupling, the polyorganosiloxane, and the fluoroelastomer where the aminosilane coupled polyorganosiloxane fluoroelastomer polymer strands are intertwined and intermolecularly bonded as a result of crosslinking with one another.

The fluoroelastomers selected are those described in detail in the above referenced U.S. Pat. No. 4,257,699 to Lentz. As described therein these fluoroelastomers, particularly from the class of copolymers and terpolymers of vinylidenefluoride hexafluoropropylene and tetrafluoroethylene, are known commercially under various designations as VITON A, VITON E, VITON E 60C, VITON E430, VITON 910, VITON GH and VITON GF. The VITON designation is a trademark of E. I. Dupont deNemours, Inc. Other commercially available materials include FLUOREL 2170, FLUOREL 2174, FLUOREL 2176, FLUOREL 2177 and FLUOREL LVS 76, FLUOREL being a trademark of 3M Company. Additional commercially available materials include AFLAS, a poly(propylene-tetrafluoroethylene), FLUOREL II (LII900), a poly(propylene-tetrafluoroethylene-vinylidenefluoride) both also available from 3M Company as well as the TECNOFLONS identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Patent, and in cross rooted Ser. No. 07/405,392.

The coating of the fuser member substrate with the uncured organosiloxane coupled fluoroelastomer material is most conveniently accomplished by spraying, dipping, or the like, a solution or homogeneous dispersion of the hybrid elastomer composition. While molding, extruding and wrapping techniques or alternative means which may be used, spraying is preferred to successfully apply the uncured polymer onto the surface to be coated. Typical solvents that may be used for this purpose include: methyl ethyl ketone, methyl isobutyl ketone, and the like.

Optional intermediate adhesive layers and/or elastomer layers may be applied to achieve desired properties and performance objectives of the present invention. An adhesive layer may be selected from, for example, epoxy resins and polysiloxanes. Preferred adhesives are proprietary materials such as THIXON 403/404, Union Carbide A-1100, Dow TACTIX 740, Dow TACTIX 741, and Dow TACTIX 742. A preferred curative for the aforementioned adhesives is Dow H41.

Other adjuvants and fillers may be incorporated in the intermediate elastomer in accordance with the present invention as long as they do not affect the integrity of intermediate layers or the cured aminosilane coupled polyorganosiloxane fluoroelastomer. Such fillers normally encountered in the compounding of elastomers include coloring agents, reinforcing fillers and fibers, crosslinking agents, processing aids, accelerators and polymerization initiators. Following coating of the uncured aminosilane coupled polyorganosiloxane fluoroelastomer onto a substrate, it is subjected in embodiments to a step curing process, for example, at about 38° C. for 2 hours; followed by 4 hours at 77° C.; and 2 hours at 177° C. A particularly preferred stepwise curing process is: 2 hours at about 93° C.; 2 hours at about 149° C.; 2 hours at about 177° C.; and 16 hours at about 208° C.

The polyorganosiloxane, which is coupled to the fluoroelastomer via an aminosilane coupling compound or equivalent is derived from a polyorganosiloxane, having reactive functionality of the formula:

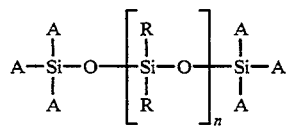

where R is independently an alkyl or alkenyl with from 1 to about 20 carbon atoms, or an alkylaryl or aryl wherein the aryl has from 6 to about 30 carbon atoms that is optionally substituted with an amino, hydroxy, mercapto, alkyl or alkenyl group, wherein the alkyl or alkenyl group has from about 1 to about 18 carbon atoms, the functional group A is independently an alkoxy or aryloxy group with from 1 to 10 carbon atoms in each alkoxy or aryloxy group, hydroxy, or a halogen, and n is a number from 2 to about 350 and represents the number of disubstituted siloxane monomeric units in the polyorganosiloxane.

In the above formula, typical R groups include methyl, ethyl, propyl, octyl, vinyl, allylic crotnyl, phenyl, naphthyl, benzyl, and phenanthryl and typical substituted aryl groups are substituted in the ortho, meta and para portions with lower alkyl groups having from 1 to about 15 carbon atoms.

The aminosilane coupling step of the present invention is accomplished in the presence of a dehydrofluorination agent, which is typically selected from the group of inorganic and organic bases such as the alkali and alkaline earth metal bases, for example, sodium, potassium, calcium and magnesium hydroxide, as well as primary, secondary and tertiary aliphatic and aromatic amines where the aliphatic and aromatic groups have from 2 to 15 carbon atoms are effective dehydrofluorination agents. This group includes aliphatic and aromatic diamines and triamines having from 2 to 15 carbon atoms, where the aromatic groups may be phenyl, toluyl, naphthyl or anthracenyl, and the like. It is generally preferred for the aromatic diamines and triamines that the aromatic group be substituted in the ortho-, meta- or para positions. Typical substituents include lower alkyl amino groups such as ethyl amino, propyl amino and butyl amino with propyl amino being preferred. However, the aminosilanes, such as N-(2-aminoethyl-3-aminopropyl)-trimethoxysilane, available as AO700 from Hüls of America, as mentioned above are preferred as coupling and/or dehydrofluorination agents.

Typically, coupling is achieved in accordance with the accompanying scheme wherein a dehydrohalogenating agent, such as a metal hydroxide salt or amine base, eliminates HF from the fluoroelastomer presumably randomly creating unsaturations indicated as "y" units. The unsaturations react with the amine functional group of the aminosilane coupling agent. The alkoxy groups (A) of the aminosilane coupled fluoroelastomers are then hydrolyzed in situ or with the aid of an acid catalyst, for example, acetic acid (HOAc) in the presence of the reactive polyorganosiloxane compound resulting in condensation of the polyorganosiloxane with the coupled aminosilane "A" functional groups. The resulting product, an aminosilane coupled polyorganosiloxane fluoroelastomer, is then used in preparative processes for fabricating fusing members using, for example, spray or dip coating procedures prior to a final curing sequence stage. The aminosilane coupled polyorganosiloxane fluoroelastomer product shown in the scheme is capable of further hydrolysis and condensation, at sites indicated by bold arrows, depending upon the reaction conditions selected and physical properties desired, for example, vicosity.

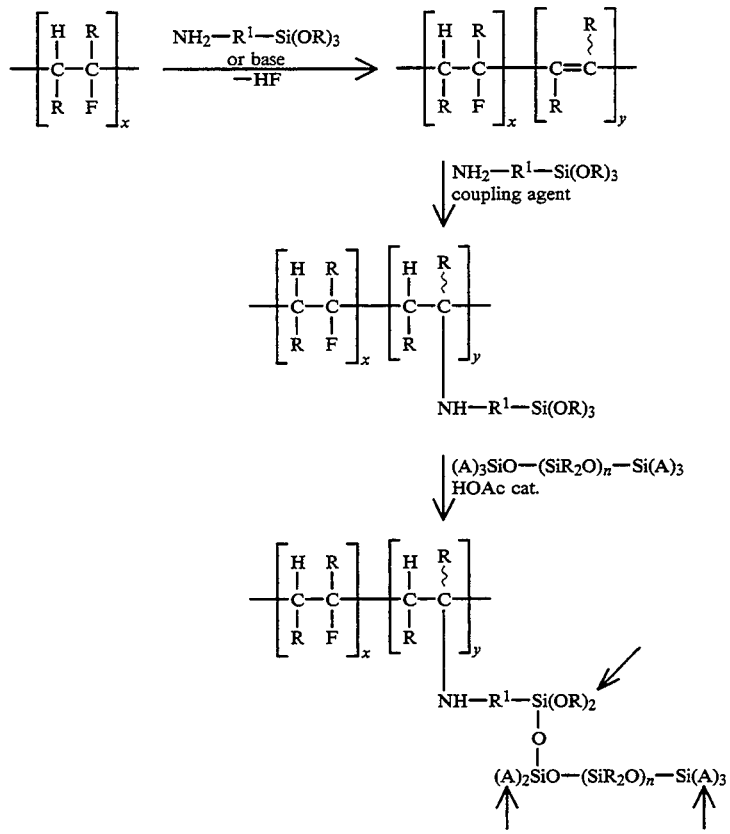

Unreacted —OR groups on the aminosilane coupling agent may subsequently react further with —A groups on polyorganosiloxanes that are uncoupled or previously coupled to other fluoroelastomers in the reaction mixture by the same hydrolysis and condensation sequence.

Thus, according to the present invention a long life fuser member has been provided for use as a fuser roll, donor roll or pressure roll, in a fusing system which does not require or only needs minimal, functional release agent or the presence of an optional metal containing filler in the transport surface of the fuser member to interact with the functional release agent to form a release layer. This enables an economical fusing system combining the advantages of fluoroelastomer fuser member surfaces and a nonfunctional conventional silicone release agent. In addition, the outer layer of the cured aminosilane coupled polyorganosiloxane fluoroelastomer is sufficiently thin that it does not interfere with the physical properties of an optional intermediate supporting fluoroelastomer layer.

The following Examples further define and describe fuser members prepared by the present invention and illustrate preferred embodiments of the present invention. Unless otherwise indicated, all parts and percentages are by weight. A comparative Example is given.

EXAMPLE I

Preparation of Amino Silane Coupled Polyorganoziloxane Fluoroelastomer Material An aminosilane coupled polyorganosiloxane fluoroelastomer composition was prepared as follows. A stock solution of VITON GF TM obtained from DuPont was prepared by dissolving 250 grams of VITON GF TM in 2.5 liters of methylethyl ketone (MEK) with stirring at room temperature. A four liter plastic bottle and a moving base shaker were used to prepare the stock solution. Approximately one hour to two hours was utilized to accomplish the dissolution. The above solution is then transferred to a four liter Edenmeyer flask and 25 ml of the amine dehydrofluorinating agent, N-(2-aminoethyl-3-aminopropyl)-trimethoxysilane (AO700) was added. The contents of the flask were then stirred using a mechanical stirrer while maintaining the temperature between 55° and 60° C. After stirring for 30 minutes, 12.5 grams of ethoxy terminated polysiloxane (PS 393 available from Hüls America Inc.), was added and stirring continued for another five minutes. About 25 grams of concentrated aqueous acetic acid catalyst was then added. The stirring was continued while heating the contents of the flask at around 65° C. for another 4 hours. During this time the color of the solution turned light yellow. The above yellow solution was then cooled to room temperature. To the solution was then added 5 grams of magnesium oxide, 2.5 grams of calcium hydroxide and 12.5 grams of curative VC-50 available from Dow Chemical Co. The above contents were then ball milled with ceramic balls as milling media for 17 hours. The solution was then diluted to about 5 liters with MEK. This dispersion was then spray coated onto a 10 by 14 inches steel substrate (3 mL thick) and air dried. The dry film was then removed from the substrate by peeling and then thermally cured by the following heating procedure: 2 hours at 93° C., 2 hours at 149° C., 2 hours at 177° C., and thereafter heating for 16 hours at 208° C. The thickness of the cured film as determined by permoscope was found to be 1 mil. The mechanical properties were determined by an Instron Model 1123 (standard test protocol ASTM 412) and the toughness was found to be 1210 lb-in/in$^3$.

EXAMPLE II

The procedure of Example I was repeated with the exception that the amount of polysiloxane PS 393 was 25 grams. The dry cured film of 8.9 mils thickness was obtained as in Example I and the toughness of this film was 925 lb-in/in$^3$.

EXAMPLE III

The procedure of Example I was repeated with the exception that the amount of polysiloxane PS 393 was 37.5 grams. The dry cured film of 9.7 mils thickness was obtained as in Example I and the toughness of this film was 911 lb-in/in$^3$.

EXAMPLE IV

The procedure of Example I was repeated with the exception that the amount of PS 393 was 50 grams. The dry cured film of 8.2 mils thickness was obtained as in Example I and the toughness of this film was 871 lb-in/in$^3$.

EXAMPLE V

The procedure of Example I was repeated with the exception that the amount of PS 393 was 62.5 grams. The dry cured film of 8.4 mils thickness was obtained as in Example I and the toughness of this film was 1.382 lb-in/in$^3$.

EXAMPLE VI

The procedure of Example I was repeated with the exception that the amount of PS 393 was 75 grams. The dry cured film of 8.2 mils thickness was obtained and the toughness of this film was 1.560 lb-in/in$^3$. A portion of the dispersion prior to curing (less than 2 liters) was used to prepare a spray coated film as described in Example I. Another portion prior to curing (less than about 1 liter) was used to fabricate a pressure roll as described in Example IX.

EXAMPLE VII

The procedure of Example I was repeated with the exception that the amount of PS 393 was 100 grams. The dry cured film of 8.8 mils thickness was obtained and the toughness of this film was 1.768 lb-in/in$^3$.

EXAMPLE VIII

The procedure of Example I was repeated with the exception that the amount of PS 393 was 125 grams. The dry cured film of 8.8 mils thickness was obtained and the toughness of this film was 1.407 lb-in/in$^3$.

EXAMPLE IX

Device Fabrication

An aluminum cylindrical sleeve (3 inches outside diameter × 15.5 inches length × ¼ inch wall thickness) is abraded with sand paper, followed by degreasing, scrubbing with an abrasive cleaner, and thorough washing with water. A primer, Dow Corning primer DC1200, is applied to the sleeve at a thickness of 2 to 3 tenths of a mil (5 to 7.5 micrometer), air dried at ambient conditions for 30 minutes and baked at 150° C. for 30 minutes. Subsequently, the primed sleeve core is provided with an intermediate layer of a liquid injection molded silicon elastomer by molding Dow Corning LSR590 to the primed sleeve core to a thickness of about 0.25 inch. The silicon elastomer is cured for 10 to 15 minutes at 150° C. but is not post cured. Following removal of the roll from the mold, the mold release material (a silicon type compound) is sanded off and the roll is cleaned with isopropyl alcohol. Then a thin layer, roughly 10 mils in thickness, of adhesive A-1100 available from Union Carbide is spray coated onto this roll to improve the adhesion. A portion of the dispersion prior to curing (less than about 1 liter) from Example VI is sprayed to a dry thickness of 2 mils onto the above prepared sleeve core having the silicone elastomer intermediate layer to form a layer of the uncured aminosilane coupled polyorganosiloxane fluoroelastomer overcoating. The resulting coated roll is then cured by the following heating profile: 2 hours at 93° C., 2 hours at 149° C., 2 hours at 177° C., and thereafter heating for 16 hours at 208° C. The coated roll is then cooled to room temperature.

The prepared roll bearing the cured overcoat is installed in a Xerox Corporation 5090 imaging apparatus as a pressure roll and 800,000 developed copies are generated where the cured overcoated pressure roll assists in fusing the toned images onto the paper. No physical or chemical degradation of the pressure roll surfaces, toner contamination or paper stripping problems are visually observed or encountered.

COMPARATIVE EXAMPLE I

A standard pressure roll with a sleeve design having a metal core, an intermediate layer of EPDM (a terpolymer elastomer prepared from ethylene-propylene diene monomer) having a thickness of about ¼ inch, and a top sleeve layer of polytetrafluoroethylene having a thickness of about 1/32 inch, when installed in the Xerox Corporation 5090 imaging apparatus showed edge wear at the 11 inch paper path region, showed toner contamination of the roller and on developed copies, and in some instances have shown physical degradation because of the heat and pressure starting at about 300,000 developed copies.

The disclosures of all patents, publications and other relevant documents referred to herein are hereby specifically, and totally incorporated herein by reference in their entirety.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A fuser member comprising a supporting substrate, and a outer layer comprised of a substantially uniform integral interpenetrating hybrid polymeric network comprised of a haloelastomer, a coupling agent, a functional polyorganosiloxane and a crosslinking agent wherein the functional polyorganosiloxane is derived from a compound having the formula:

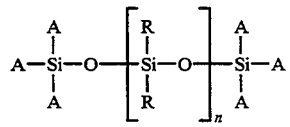

where R is independently an alkyl or alkenyl with from 1 to about 20 carbon atoms, or an alkylaryl or aryl group wherein the aryl of the alkylaryl or aryl group contains from 6 to about 30 carbons atoms and is optionally substituted with an amino, hydroxy, mercapto, or alkyl or alkenyl group having from about 1 to about 18 carbon atoms, the functional group A is independently an alkoxy or aryloxy group with from 1 to about 10 carbon atoms in each alkoxy or aryloxy groups, a hydroxy, or a halogen, and n is a number of from 2 to about 350 and represents the number of disubstituted siloxane monomeric units in the polyorganosiloxane; wherein the hybrid polymeric network is formed by the sequential reaction of the haloelastomer with a dehydrohalogenating agent, reaction with the coupling agent, condensation with the functional polyorganosiloxane, and crosslinking with the crosslinking agent.

2. The fuser member of claim 1, wherein the haloelastomer is a fluoroelastomer.

3. The fuser member of claim 2, wherein the fluoroelastomer is selected from the group consisting of poly(vinylidene fluoride-hexafluoro-propylene) and poly(vinylidene fluoride-hexafluoropropylene-tetrafluoroethylene).

4. The fuser member of claim 1, wherein the outer layer is from about 10 to about 250 micrometers thick.

5. The fuser member of claim 1, wherein the supporting substrate is a cylindrical sleeve, a drum, a belt, or an endless belt.

6. The fuser member of claim 5 wherein the supporting substrate is selected from the group consisting of aluminum, copper, and steel.

7. The fuser member of claim 1, further comprising from one to about ten intermediate layers between the substrate and the outer layer.

8. The fuser member of claim 7, wherein the one or more intermediate layers are selected from the group of an elastomer layer, an adhesive layer, or both.

9. The fuser member of claim 8, wherein the intermediate elastomer layer comprises a haloelastomer or a silicon elastomer.

10. The fuser member of claim 8, wherein the adhesive layer comprises a polymeric compound selected from the group consisting of epoxy resins and silanes.

11. The fuser member of claim 1, wherein the fuser member is a pressure roll, a fuser roll or a release agent donor roll.

12. The fuser member of claim 1 wherein the crosslinking agent is a mixture of a bisphenol material and an accelerant compound.

13. The fuser member of claim 1, wherein the aminosilane coupling agent also functions as the dehydrohalogenating agent and is of the formula:

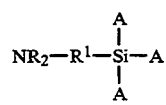

where R is independently a hydrogen, an alkyl or alkenyl group with from 1 to about 20 carbon atoms, or an alkylaryl or aryl group with from 6 to 30 carbon atoms, and wherein at least one R is a hydrogen; $R^1$ is an alkyl or alkenyl group with from 1 to 20 carbon atoms or an aryl group with from 6 to about 30 carbon atoms and is optionally substituted with an alkyl or alkenyl group with from 1 to about 20 carbon atoms; and the functional groups represented by the letter A are selected from the group consisting of hydroxy, alkoxy, aryloxy, or halogen.

14. The fuser member of claim 1, wherein the dehydrohalogenating agent is selected from the group consisting of primary, secondary and tertiary aliphatic and aromatic amines where the aliphatic groups have from about 2 to about 15 carbon atoms and aromatic groups have from 6 to about 30 carbon atoms, and metal hydroxide salts.

* * * * *